United States Patent Office 3,041,351
Patented June 26, 1962

3,041,351
HETEROCYCLIC MERCAPTAN COMPOUNDS
Lee Nutting, Berkeley, and Robert M. Silverstein and Chester M. Himel, Menlo Park, Calif., assignors to Hills Bros. Coffee, Inc., San Francisco, Calif., a corporation of California
No Drawing. Filed Nov. 4, 1955, Ser. No. 545,135
2 Claims. (Cl. 260—330.5)

This invention relates to organic compounds and has particular reference to new mercaptans and their preparation.

This invention has as an object the preparation of new organic compounds. A further object is the preparation of a new class of mercaptan compounds. Yet another object of this invention is the preparation of a new group of heterocyclic mercaptan compounds.

Other objects and advantages of this invention it is believed will be readily apparent from the following detailed description of preferred embodiments thereof.

These and other objects are accomplished by the following invention wherein organic disulfides are reduced or wherein organic halides are reacted with isothiourea.

The invention is illustrated by the following specific examples:

EXAMPLE 1

*2-Benzofurfuryl Mercaptan*

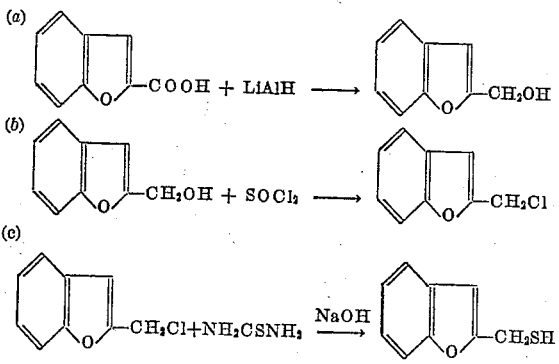

(a) To a stirred slurry of 10 g. of lithium aluminum hydride in 200 ml. ether was added dropwise a suspension of 30 g. of coumarilic acid in 200 ml. of ether. After decomposing the complex and excess lithium aluminum hydride, and extracting with ether, 27 g. of coumarilic alcohol was obtained. B.P. 140–145° C. at 13 mm.

(b) and (c) To 5.0 g. of coumarilic alcohol in 40 ml. of ether, stirred and cooled in an ice bath, was added portionwise 5.0 ml. of thionyl chloride in 25 ml. of ether. After 45 minutes, the ether solution was washed, dried, and evaporated. The residue was dissolved in 10 ml. of 95% ethanol and refluxed for 1.5 hours with 2.3 g. of thiourea. After standing overnight, the solution was refluxed for 45 minutes with 2.0 g. of sodium hydroxide in 20 ml. of water. After dilution and acidification, the mixture was extracted with ether. The residue from the ether solution was distilled at 4 mm. at a head temperature of 108–110° C. The distillate (benzofurfuryl mercaptan) weighed 2.2 g., and gave the following analytical values:

|  | Calculated, percent | Found, percent |
|---|---|---|
| Carbon | 65.9 | 66.9 |
| Hydrogen | 4.87 | 5.00 |

EXAMPLE 2

*3-Thionaphthylmethyl Mercaptan*

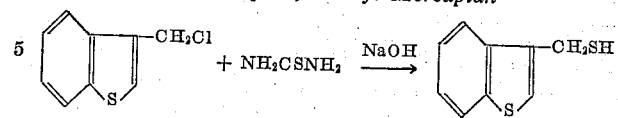

Thiourea (.6 g.) in hot 95% ethanol was added to 3-chloromethylthionaphthene (1.3 g.). The solution was refluxed for nineteen hours and allowed to stand three days. Sodium hydroxide (1 g.) in water (15 ml.) was added to the reaction mixture, and the solution was refluxed five hours. The solution was acidified with hydrochloric acid and extracted with ether. The ether solution was washed with water, dried, and concentrated. The residue distilled at 156° C. at a pressure of 9.5 mm., the distillate comprising 3-thionaphthylmethyl mercaptan.

EXAMPLE 3

*3-Indolemethyl Mercaptan*

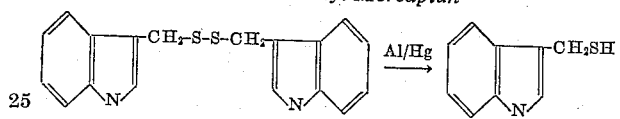

24 g. of bis-(3-indolemethyl) disulfide (prepared, by the reaction between 3-indolealdehyde and ammonium sulfide, in accordance with Example 2 of our copending application Serial No. 525,354, filed July 29, 1955, and now abandoned, entitled "Condensed Ring Heterocyclic Disulfides") was refluxed with 30 g. of amalgamated aluminum in 1000 ml. of ether and 60 ml. of water until the aluminum was consumed. The mercaptan was distilled at 125–127° C. at a pressure of 1 mm. The distillate gave the following analytical values:

|  | Calculated, percent | Found, percent |
|---|---|---|
| Carbon | 66.3 | 66.6 |
| Hydrogen | 5.52 | 5.70 |
| Sulfur | 19.6 | 19.7 |

EXAMPLE 4

*2-Pyrrolemethyl Mercaptan*

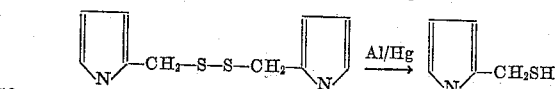

0.70 g. of bis-(2-pyrrolemethyl) disulfide (prepared, by the reaction between 2-pyrrolealdehyde and ammonium sulfide, in accordance with Example 2 of our copending application Serial No. 545,134, filed November 4, 1955, and now Patent No. 2,951,848, entitled "Heterocyclic Disulfides and Their Preparation") was reduced with amalgamated aluminum in moist ether. The product weighed 0.33 g. and was distilled at 72° C. at a pressure of 2 mm.

EXAMPLE 5

*N-Methyl-2-Pyrrolemethyl Mercaptan*

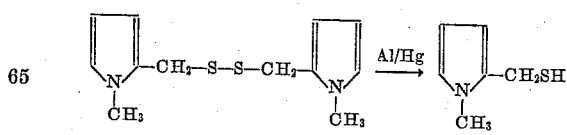

Reduction of N-methyl-2-pyrrolemethyl disulfide (prepared, by the reaction between N-methyl-2-pyrrolealdehyde and ammonium sulfide, in accordance with Example 3 of our copending application Serial No. 545,134, filed November 4, 1955, and now Patent No. 2,951,848, entitled "Heterocyclic Disulfides and Their Preparation") with amalgamated aluminum in moist ether gave the mercaptan which was distilled at 63–64° C. at a pressure of 2 mm.

The new compounds of this invention are particularly useful as intermediates in the preparation of heterocyclic disulfide compounds. Thus, for example, 2-benzofurfuryl mercaptan is utilized as an intermediate in the production of bis-(2-benzofurfuryl) disulfide, as disclosed in Example 1 of our above-identified copending application Serial No. 525,354, and now abandoned; 3-thionaphthylmethyl mercaptan is used as an intermediate in the preparation of bis-(3-thionaphthylmethyl) disulfide, as disclosed in Example 3 of said application Serial No. 525,354; and similarly, the yields of 2-pyrrolemethyl disulfide, N-methyl-2-pyrrolemethyl disulfide and bis-(3-indolemethyl) disulfide are improved by reducing the non-crystallizable portions to the corresponding mercaptans, herein disclosed, isolating the mercaptans and air-oxidizing them back to the disulfides.

Having fully described our invention, it is to be understood that we do not wish to be limited to the details set forth, but our invention is of the full scope of the appended claims.

We claim:
1. 2-benzofurfuryl mercaptan.
2. 3-thionaphthylmethyl mercaptan.

References Cited in the file of this patent

UNITED STATES PATENTS

| | | |
|---|---|---|
| 2,584,131 | Hunter | Feb. 5, 1952 |
| 2,610,968 | Kleiman | Sept. 16, 1952 |

FOREIGN PATENTS

| | | |
|---|---|---|
| 484,244 | Germany | Oct. 24, 1929 |

OTHER REFERENCES

Kipnis and Ornfelt: J. Am. Chem. Soc., vol. 71, page 2270 (1949).

Licari et al.: Journal of the American Chemical Society, vol. 76 pages 4039–4040 (1954).